UNITED STATES PATENT OFFICE.

CARLETON ELLIS, OF MONTCLAIR, NEW JERSEY, ASSIGNOR TO ELLIS-FOSTER COMPANY, A CORPORATION OF NEW JERSEY.

SOLID DISINFECTING COMPOSITION CONTAINING OIL.

1,048,815.  Specification of Letters Patent.  Patented Dec. 31, 1912.

No Drawing.  Application filed August 8, 1911. Serial No. 642,983.

*To all whom it may concern:*

Be it known that I, CARLETON ELLIS, a citizen of the United States, and a resident of Montclair, in the county of Essex and State of New Jersey, have invented certain new and useful Improvements in Solid Disinfecting Compositions Containing Oil, of which the following is a specification.

This invention relates to solidified oil and relates particularly to mixtures of a solid or gelatinous character, containing essential oils, such as Russian turpentine and oil of camphor, all of which is more fully hereinafter described.

In the manufacture of solidified oils for disinfecting purposes, it is desirable to incorporate a certain amount of cresylic acids or similar phenolic bodies in order to enhance the disinfecting action. The addition of cresylic acid, for example, to the composition described in patent application, Serial No. 519,642 filed Sept. 25, 1909, and Serial No. 552,177, filed Mar. 29th, 1910 (of which this case is in part a divisional continuation) in general produces a product having a too pronounced degree of solubility. That is to say, if a cake of the solidified preparation is placed in running water, for example, it is softened and dissolved too quickly for some purposes, when cresylic acid is present. For example a mixture composed of 2 gals. of Russian turpentine, 3¼ gallons mineral oil, ¼ gallon cresylic acid, 2¾ pounds stearic acid, 14¼ fluid ounces of caustic soda of 50% strength and 7 fluid ounces of water, produces a fairly firm transparent cake, which is useful as a deodorant in certain applications, but for other purposes, especially when coming in contact with running water, the oil is gradually washed from the cake in the form of an emulsion and its solution is too rapid to meet certain requirements.

A mixture composed of Russian turpentine 1¼ gallons, 28 fluid ounces; mineral oil, 3⅛ gallons; cresylic acid 2¼ lbs.; stearic acid 2½ lbs., rosin 1¼ lbs., caustic soda of 50% strength, 15 fluid ounces, water 7 fluid ounces and paraffin wax 5 pounds, forms a firm cake which gradually becomes opaque on standing and is a trifle more soluble than the foregoing formula owing to the presence of rosin, which by forming a rosin soap, causes an increase in solubility. The paraffin has the reverse effect, decreasing the solubility, so that it is possible by proportioning the amount of sodium stearate or resinate or other soap stock to the amount of paraffin or other wax, to diminish the solubility of the product and thereby regulate the rate of solution. Waxes are however, regarded as objectionable owing to their tendency to leave a greasy residue and to form soft waxy deposits on the walls of the containers when exposed to the action of water.

The present invention relates particularly to the use of extending materials of a substantially unsaponifiable character which may be used for regulating the degree of solubility and hardness of the resulting cakes and which do not have the tendency exhibited by waxes of producing greasy deposits or residues. For this purpose, I preferably make use of an unsaponifiable resin or resinous body, such as Pontianac or Jellutong rubber resin, or any other similar resin substantially free from soap matter, or containing a preponderating amount of unsaponifiable matter.

As an example of the foregoing, 4 parts of Pontianac resin, ½ part of stearic acid are melted together, 2¾ parts of Russian turpentine and ½ part of cresylic acid are added and well incorporated, then one part of mineral oil is introduced and finally ⅓ part of a 50% solution of caustic soda is added with thorough agitation. This produces on cooling, a firm, solid, transparent material, which after standing for a few days shows signs of figging. On standing for a few weeks or months, this figging becomes very marked and the particles producing the figging appear in small globular bodies which gives the product an unusual and characteristic appearance. The product in this form is, for certain applications open to the objection of inflammability. That is to say, when a lighted match is brought in contact with a cake of this solidified preparation, it burns rather freely and for some purposes this is objectionable. The following formulas include certain ones which are free from this objection, in that when a flame is brought in contact with the cakes, they either do not ignite at all, unless the flame is applied for a long period; or there may be a momentary ignition locally, but not complete inflammation.

2 parts Russian turpentine, 1 part cresylic acid, 1 part mineral oil, 4 parts Pontianac resin, 1 part rosin, ½ part stearic acid and ⅓ part caustic soda are incorporated as above indicated or in any other suitable manner. A good solid cake is produced which becomes figged in the course of time to a greater or less extent. It is very difficult to ignite, and in fact, from the point of view of the present art is practically non-inflammable. It is slightly heavier than water.

In contrast to this, a decidedly inflammable preparation is produced from Russian turpentine 2¾ parts, cresylic acid ½ part, mineral oil 1 part, Pontianac resin 4 parts, stearic acid ½ part and 50% solution of caustic soda ⅓ part. This cake is rather lighter than water and therefore floats.

A non-inflammable preparation is made from Russian turpentine 1 part, cresylic acid 2 parts, mineral oil 1 part, Pontianac resin 4 parts, rosin 1 part, stearic acid 1 part, and caustic soda solution of 50% strength ⅓ part. This is heavier than water.

A formula similar to the preceding, but without rosin, that is to say Russian turpentine 1 part, cresylic acid 2 parts, mineral oil 1 part, Pontianac resin 4 parts, stearic acid ½ part and caustic soda solution of 50% strength ⅓ part is quite inflammable. Hence inflammability is modified by the introduction of rosin.

Also a mixture of Russian turpentine 1 part, cresylic acid 1 part, Pontianac resin 4 parts, stearic acid ½ part, paraffin wax 1 part and caustic soda solution of 50% strength ⅓ part is inflammable.

Inflammable mixtures are produced from Russian turpentine 1 part, cresylic acid 1 part, Pontianac resin 4 parts, stearic acid ½ part, paraffin wax 2 parts and caustic soda of 50% strength ⅓ part.

A less inflammable mixture is made from cresylic acid 1½ parts, Pontianac resin 4 parts, stearic acid ½ part, caustic soda solution of 50% strength ⅓ part.

For comparative purposes, the following formulas are also set forth:—

A mixture composed of mineral oil 1 part, rosin 1 part, Pontianac resin 4 parts, stearic acid ½ part, and caustic soda solution of 50% strength ⅓ part, is non-inflammable.

A mixture composed of mineral oil 1 part, Pontianac resin 4 parts, stearic acid ½ part, and caustic soda of 50% strength ⅓ part is somewhat inflammable.

A quite non-inflammable preparation is produced from Russian turpentine 1 part, cresylic acid ½ part, mineral oil 1 part, rosin 1 part, Pontianac resin 4 parts, stearic acid ½ part and caustic soda solution of 50% strength ⅓ part.

Another non-inflammable product is obtained from Russian turpentine 1 part, cresylic acid ½ part, mineral oil 1 part, rosin ½ part, Pontianac resin 4 parts, stearic acid ½ part and caustic soda solution of 50% strength ⅓ part, while an inflammable cake is secured from Russian turpentine 1 part, cresylic acid ½ part, mineral oil 1 part, Pontianac resin 4 parts, stearic acid ½ part, and caustic soda solution of 50% strength ⅓ part.

Another formula illustrating the effect of changing the proportion of these materials, is the following:—Russian turpentine 1 part, cresylic acid ½ part, Pontianac resin 4 parts, rosin 1 part, stearic acid ½ part and caustic soda solution of 50% strength ⅓ part, which is non-inflammable, and also the following:—Russian turpentine 1 part, cresylic acid ½ part, Pontianac resin 4½ parts, rosin ½ part, stearic acid ½ part and caustic soda solution of 50% strength ⅓ part.

Another formula made up of Russian turpentine 1 part, cresylic acid ½ part, Pontianac resin 4½ parts, rosin ¼ part, stearic acid ½ part and caustic soda solution of 50% strength ⅓ part, is slightly inflammable.

These three formulas contain rosin from 1 part down to ¼ part respectively, the other proportions remaining practically the same and the inflammability increasing with the decrease in rosin. In other words the rosin soap formed by the union of the rosin with the alkali tends to modify the degree of non-inflammability. From among these formulas therefore may be selected those which have the requisite degree of non-inflammability and also the requisite degree of solubility, it being understood that the degree of non-inflammability may be regulated very largely by varying the amount of rosin soap, although of course the percentage of volatile essential oils is a factor also to be considered. Too great an amount of rosin however, would form a product which for certain applications is too soluble, hence the addition of the rubber resin, which by introducing an unsaponifiable element depresses the solubility. Therefore by varying the proportion of essential oils, cresylic acid, etc., Pontianac resin, etc., rosin, etc., and stearic acid, etc., varying degrees of stiffness, transparency, solubility and inflammability may be secured.

With a large proportion of the Pontianac resin, the resulting cakes when freshly made are somewhat sticky, and for purposes of immediate shipment or packaging, the cakes may be quickly dipped into a bath of melted paraffin wax or other wax, so as to form a glaze of wax on the surface and thus render the packaging an easier matter.

If the cakes are dipped rapidly into hot paraffin, the solidified oil does not dissolve and a waxy coating is secured.

It should be understood that the foregoing formulas have been selected for illustrative purposes to show the results of varying the several components of such mixtures, and it should be further understood that various essential oils may be used in place of Russian turpentine, such for example as pine oil, oil of camphor, cedar tar oil and the like, according to the particular character of the deodorant desired. The mineral oil is added as a minor extending material and it should not be used in too large amounts, as it tends to reduce the stiffness of the resulting cakes. Too great a proportion of cresylic acid especially if a relatively large amount of caustic soda is used, leads to increased solubility. The proportion of stearic acid within certain limits governs the stiffness of the cakes. The use of caustic soda to gain stiffness is preferable to caustic potash, or mixtures of caustic soda or caustic potash. Transparency is influenced by the amount of water present. With a very low percentage of water the cakes are under certain conditions, soft and opaque. This also occurs with too great an amount of water. For example, by reference to the formula first above given, it will be observed that 7 ounces, (fluid), of water were employed in addition to the water contained in the caustic soda solution. If the water had been entirely omitted, except that contained in the caustic soda solution, a slightly cloudy cake might be formed, while with the addition of the 7 fluid ounces of water, a perfectly clear transparent cake is secured.

From the foregoing, it will therefore be seen that a number of factors enter into the problem of making a solidified oil of a proper degree of inflammability and regulated solubility, having a suitable degree of stiffness and transparency.

What I claim is:—

1. A solid disinfecting composition, comprising an essential oil, unsaponifiable extending material of a non greasy character, a phenol, rosin and a soap of a fatty acid.

2. A solid disinfecting composition, comprising an essential oil, an unsaponifiable extending material of a non-greasy character, a phenolic body, rosin, the soap of a fatty acid and water.

3. A solid disinfecting composition, comprising an essential oil, an extending material of a non-greasy character, a phenolic body, the sodium soap of a fatty acid, rosin soap and water.

4. A solid disinfecting composition, comprising an essential oil, extending material of a non-greasy character, cresylic acid, sodium stearate, sodium resinate and water.

5. A solid disinfecting composition, comprising Russian turpentine, cresylic acid, mineral oil, a rubber resin, sodium stearate and resinate and water.

6. A solid disinfecting composition, comprising an essential oil, including Russian turpentine, cresylic acid, mineral oil, Pontianac resin, the sodium soaps of rosin and stearic acid and a modicum of water.

7. A solid disinfecting composition comprising Russian turpentine a phenolic body and stiffening material.

8. A solid disinfecting composition comprising Russian turpentine cresylic acid and sodium stearate.

Signed at Montclair in the county of Essex and State of New Jersey this 20th day of April A. D. 1911.

CARLETON ELLIS.

Witnesses:
SYDNEY M. SPEDON,
BIRDELLA M. ELLIS.